No. 691,113. Patented Jan. 14, 1902.
A. M. CATLIN.
EDUCATIONAL APPLIANCE.
(Application filed Jan. 3, 1901.)
(No Model.)
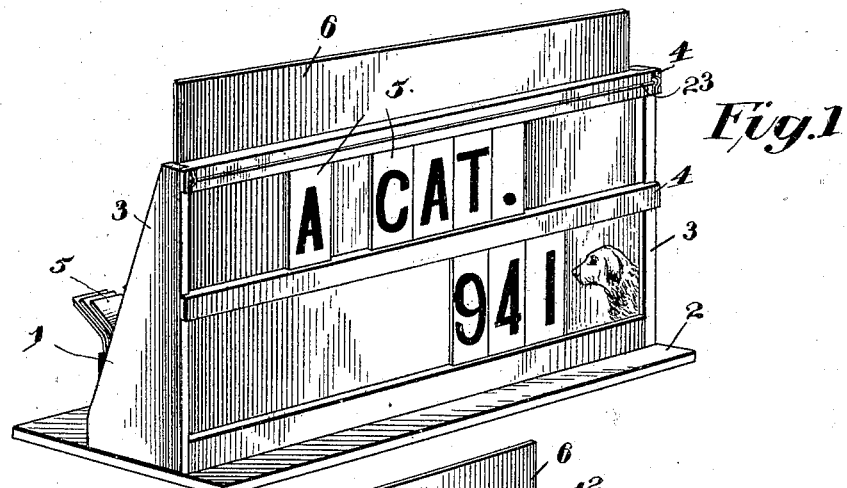
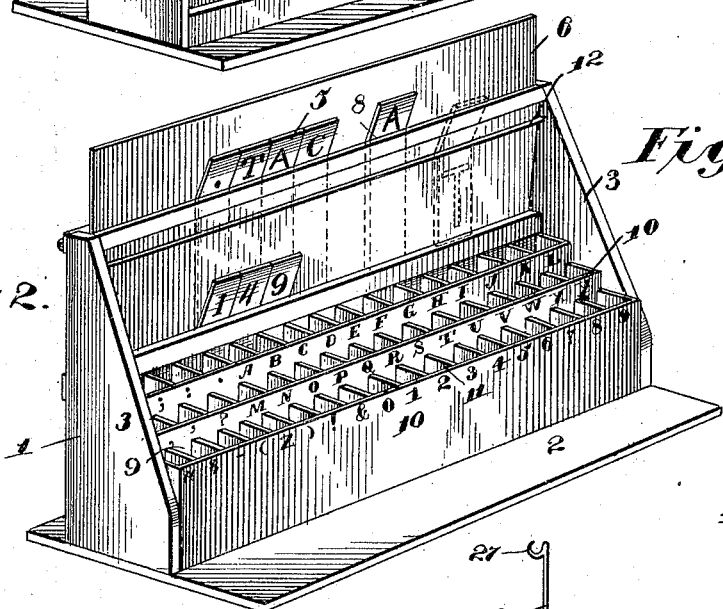
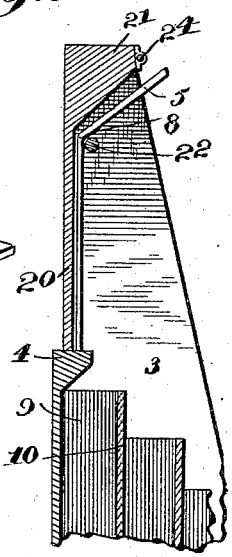
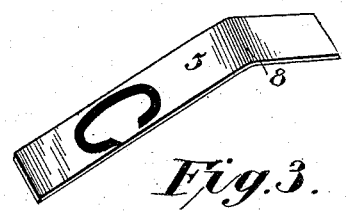
Witnesses
Fenton S Belt,
Geo T Kingsbury
Inventor
Alice M. Catlin
By Mason Fenwick Lawrence
Attorneys
THE NORRIS PETERS CO., PHOTO-LITHO., WASHINGTON, D. C.

UNITED STATES PATENT OFFICE.

ALICE M. CATLIN, OF MONTROSE, COLORADO.

EDUCATIONAL APPLIANCE.

SPECIFICATION forming part of Letters Patent No. 691,113, dated January 14, 1902.

Application filed January 3, 1901. Serial No. 41,982. (No model.)

*To all whom it may concern:*

Be it known that I, ALICE M. CATLIN, a citizen of the United States, residing at Montrose, in the county of Montrose and State of Colorado, have invented certain new and useful Improvements in Educational Appliances; and I do hereby declare the following to be a full, clear, and exact description of the invention, such as will enable others skilled in the art to which it appertains to make and use the same.

My invention relates to improvements in educational appliances; and its object is to provide means whereby letters, words, sentences, signs, or pictorial effects may be exhibited in succession or simultaneously for teaching certain things to pupils or for amusing or interesting them.

It consists in an apparatus having one or more longitudinal supports adapted to receive pieces of cardboard or like material having indications upon them, the structure being such that a series of indications may be presented to form certain results and exhibit them to persons to be taught or edified.

It also consists in an apparatus comprising a frame having one or more tiers of supports, shields interposed between said supports, and means for inserting cards, slips, or slides into recesses formed at the different tiers or supports, so that certain letters, indications, or configurations, as well as designs, may be exposed upon the outer or the inner side of the device.

It further consists in a device having a frame provided with longitudinally-arranged supports, slides or cards adapted to be arranged upon the same, and a series of boxes or receptacles provided with suitable configurations for receiving the slides or cardboards and holding them in an assorted order ready for use.

It further consists in certain other novel constructions, combinations, and arrangements of parts, as will be hereinafter fully described and claimed.

In the accompanying drawings, Figure 1 represents a perspective view of my improved educational apparatus looking at the same from one side thereof. Fig. 2 represents a perspective view of the apparatus from the other side thereof. Fig. 3 is a detail perspective view of one of the cards or slides used in the device. Fig. 4 is a transverse cross-section through the apparatus. Fig. 5 is a detail cross-section through a modified form of my improved educational apparatus.

My improved educational device is so constructed that it may be used by teachers or instructors for educating or edifying pupils or students, the device being capable of manipulation from the rear by the teacher or instructor, so that the results only will be seen by those upon the other side of the device. This is useful in building up sentences or developing thoughts before the pupils or audience, and since the teacher may operate the same from the rear the said operation will not detract from the attention which it is desired to focus upon the results produced in the front of the device. The attention of the pupils or students will be riveted upon the characters or signs exhibited, and their attention can be held by their desire to watch the process of the development of the thought or a sentence or a word.

The device is also designed for use by pupils, since by turning it about the pupils can be made to go to the apparatus and select certain slides or cards and with them build words, phrases, sentences, or develop certain thoughts.

In placing the invention in practical form I preferably construct a frame, as 1, having a suitable base 2, formed with uprights or standards 3 3 at the end thereof. At suitable intervals and at suitable heights above one another I arrange cross-bars, as 4 4, to form supports for the cards or slides 5 5 used in manipulating the apparatus. Between the bars 4 4 and above the top bar are preferably arranged a series of shields or opaque pieces, as 6 6, so as to fill the space between the bars and to extend a suitable distance above the frame. To the rear of each shield-piece 6 in each of the bars or supports 4 4 is formed a vertical slot or recess 7 7, into which may be inserted one or more of the cards or slides 5 5. The shields are preferably arranged so that the cards or slides 5 may be inserted in one of the slots 7, so as to extend downwardly in front of the shield just below the slot used, as will be apparent by reference to Fig. 4 in the drawings. The cards or slides 5 5 are formed with their upper ends bent to one side, as at 8, so as to prevent the cards or slides slipping too far through the slots 7 7 and dropping out of position. By having these bent ends 8 8 also handholds are formed for placing and arranging the said cards. Upon one side of the frame 1 I arrange means to hold the slides or cards in orderly manner, and for this purpose I preferably form a series of pockets, as at 9 9. These pockets are preferably arranged in tiers, one tier being slightly above its adjacent tier, as will be seen by reference to Fig. 2 of the drawings. These pockets may be readily formed by employing a series of vertical cross-pieces, as 10 10, which extend from one end of the frame to the other and are preferably arranged between the end standards 3 3, and then placing between the said pieces 10 10 a series of partitions, as 11 11, forming boxes or pockets of the desired form and shape.

When the alphabet, the punctuation-marks, together with the numerals, are to be used in the apparatus, I find it advantageous to arrange the characters in an order similar to that employed in the keyboards of ordinary type-writers, since this places the characters most used in a central and convenient position. It will be evident, of course, that I may make any number of pockets and any number of tiers of pockets, as found most desirable, without departing from the spirit of the invention and that the size and depth of the pockets may be varied without affecting the idea. The cards or slides 5 are provided with characters, preferably upon both sides thereof, so that not only the operator of the device will be able to see them, but will be able to exhibit the desired indications upon the front of the apparatus. When the characters of the alphabet and the numerals are used, a series of cards or slides may be arranged side by side, so as to produce certain combinations, certain words or phrases, or to develop certain ideas, the cards or slides being placed in position one after the other if it is desired to develop the result in the presence of parties to be instructed, or the cards or slides may be arranged previously and the device set before the audience with the slides all in position.

In using my improved apparatus, to which I have given the name of "printery," a teacher or instructor will place the device in a suitable position with the pockets or boxes 9 9 nearest himself and the other side of the apparatus facing the parties to be instructed or the audience. The instructor may then select the cards or slides as he needs them from the pockets 9 immediately before him and insert them through the slots 7 7 in the supporting-bars 4, so that their marked ends will project downwardly in front of the shield 6 6 and be thus exposed in the sight of the audience. Letters, combinations of letters, words, sentences, &c., or combinations of figures or pictorial designs, musical signs, or any desired configurations may thus be presented to the view of an audience or scholar.

My device is particularly suitable for use in kindergartens and schools and will be found to form an interesting as well as valuable aid in imparting instruction. The device may also be used in a slightly different manner from that heretofore given. It may be employed for causing the scholars or other students to select and arrange the cards or slides 5 themselves for producing certain combinations and results. When used in this manner, it is preferable to turn the apparatus so that the pockets 9 will be toward the pupils, and instead of inserting the cards through the slots 7 7 they may be slipped behind a bar or support 12, secured between the standards 3 3 and arranged a suitable distance above the pockets 9. When using the apparatus in this manner, the slides or cards are only visible from one side of the apparatus. The device can be used in this manner for teaching pupils to spell or build up words or sentences or to develop ideas for themselves.

When using the device as a teacher's apparatus, the alphabet or other signs placed upon the cards may be provided with diacritical marks, if desired, for teaching certain things or for indicating phonetic values. When the device is used by the students themselves, it will be usually unnecessary to provide the cards or slides with such diacritical marks. Instead of bending the upper ends of the cards or slides to prevent their sliding through the slots the said slides or cards may be provided with any suitable stops secured thereto or formed thereon, all within the spirit of the invention. The slides or cards may be provided with indications only upon one side, if desired; but I find it much better to place the indications or characters upon both sides thereof. The shields or screens 6 6 may be made of any suitable material; but it is convenient and sufficient to form them of pieces of cardboard or similar material, this also rendering the device light and easy to handle and move from place to place.

The device may be constructed only for use by the pupils themselves, as shown in Fig. 5 of the drawings, in which case the apparatus is formed with the back board, as 20, secured to the base and to a cross-piece 21 at the top. In this instance the cross-piece 21 is preferably formed with a beveled under face, and a supporting-rod 22 is mounted in the frame just below the beveled face of the bar 21 and a little in front of the back board 20, so that the cards or slides may be arranged upon the said rod or wire between it and the back board. If desired, also, a wire or rod may be arranged along the top of the apparatus, either in the front, as shown at 23 in Fig. 1 of the drawings, or at the rear, as shown at 24 in Fig. 5 of the drawings. Curtains of any suitable material may be hung upon these rods or wires 23 and 24, if desired, to hide the work upon the apparatus until the teacher or instructor desires to expose the same to view. I also contemplate arranging the vertical post or rod upon the frame of the apparatus, as at 26, the said post being provided with a hook or a similar supporting means 27 at its upper end, the idea being to provide a means for suspending large pictures or articles of various kinds which may be made the subject of discussion before a class or audience.

In constructing the slots when the apparatus is used from the rear by the teacher only the said slots 7 may be lined with some suitable cloth or similar material to prevent the cards or slides from being easily knocked out of position.

The use of the apparatus is quite extensive and may be varied to suit many occasions. It may not only be used for orthography, but orthoepy, music, numbers, illustrations, &c., and also entire stories, arithmetic lessons, and language lessons can be constructed upon the device. The device is also noiseless, and the lightness of material makes it easy of manipulation. The providing of the cards or slides with handles not only facilitates their use, but prevents the exposed faces of the cards from becoming soiled in handling them.

As above indicated, the pockets may be arranged on the plan of a type-writer keyboard, including, as shown, the raised tiers or steps, thus bringing the cards within the easiest possible reach of the fingers, this plan incidentally causing the manipulators of the cards to gain a knowledge of the type-writer keyboard.

The apparatus is preferably made of light material and may be hinged to the wall to supplement the use of a blackboard, if desired, and will obviate the necessity of using chalk and prevent the disagreeable features resulting from chalk-dust. The simplicity of the apparatus will also make it a cheap article to manufacture, and if the cards become soiled the expense of obtaining another set will be comparatively small.

Having thus described my invention, what I claim as new, and desire to secure by Letters Patent, is—

1. An educational apparatus comprising a frame having a series of horizontal supports formed with elongated slots therein, screens extending between the supports and arranged in different planes approximately parallel to each other, and cards or slides adapted to be placed in the said slots, the cards being placed in position by inserting them behind one screen and permitting them to project in front of the screen below, substantially as described.

2. An educational apparatus comprising a frame, longitudinal supports formed thereon and provided with slots, screens interposed between the supports and extending in planes approximately parallel with each other, each successive upper screen being a little in advance of the one below, and cards or slides adapted to project through the slots in the support, the structure being such that they may be inserted behind one screen so as to project in front of the next lower screen and indications thus be presented upon the opposite side of the apparatus from the operator, substantially as described.

3. An educational appliance comprising a frame, screens in said frame, a series of supports arranged upon both sides of said screens, a series of cards or slides having configurations or designs formed thereon which are arranged upon the said supports so as to extend through from one side to the other side of the said screens, substantially as described.

4. An educational appliance comprising a frame, a series of supports formed thereon having slots in them, shields to the rear of each slot, a series of partitions mounted upon the frame and forming pockets to the rear of the supports, the said pockets having indications upon them corresponding with indications upon cards or slides, and cards or slides assorted in proper order in the said pockets, whereby a teacher or instructor may take such slides as he desires from the pockets and insert them in the slot so as to appear on the series of screens, substantially as described.

5. An educational appliance comprising a frame, screens in said frame, one or more supports upon each side of the screens, cards or slides for said supports, the structure being such that the cards may be suspended from the rear by an instructor upon a front support so as to appear on the opposite side of the screen from the instructor, or the cards may be entirely manipulated upon the same side of the device on which they are exposed by pupils themselves or others to be instructed or edified, substantially as described.

In testimony whereof I hereunto affix my signature in presence of two witnesses.

ALICE M. CATLIN.

Witnesses:
F. D. CATLIN,
D. L. MARKLEY.